United States Patent

Banfield et al.

[11] Patent Number: 5,707,155
[45] Date of Patent: Jan. 13, 1998

[54] MULTILAYER SLIDING BEARING

[76] Inventors: Robert Richard Banfield, Rua Frederico Grotte, 64-Apt. 25, Sao Paulo-SP, Brazil, 05818-270; JoséRoberto Simão, Rua Cônego Manoel Vaz, 690, São Paulo-SP, Brazil, 02019-50; Ademir Carubelli, Rua João Protezek, 86, São Paulo-SP, Brazil, 04652-030

[21] Appl. No.: 492,081
[22] PCT Filed: Dec. 16, 1993
[86] PCT No.: PCT/BR93/00046
  § 371 Date: Jun. 28, 1996
  § 102(e) Date: Jun. 28, 1996
[87] PCT Pub. No.: WO94/15108
  PCT Pub. Date: Jul. 7, 1994

[30] Foreign Application Priority Data

Dec. 29, 1992 [BR] Brazil ................... 9204743

[51] Int. Cl.⁶ ................................... F16C 33/06
[52] U.S. Cl. .................. 384/295; 384/276; 384/294
[58] Field of Search .................. 384/295, 276, 384/294, 288, 282, 283

[56] References Cited

U.S. PATENT DOCUMENTS 1,637,317 7/1927 Shoemaker.
2,187,755 1/1940 Ryder.
2,648,580 8/1953 Lignian.

FOREIGN PATENT DOCUMENTS

| 0157757 | 1/1985 | European Pat. Off. |
| 58501 | 1/1954 | France. |
| 1235536 | 5/1960 | France. |
| 36 21 577 | 6/1986 | Germany. |
| 2158164 | 4/1985 | United Kingdom. |

*Primary Examiner*—Lenard A. Footland
*Attorney, Agent, or Firm*—Darby & Darby

[57] ABSTRACT

Multilayer sliding bearing, of the type comprising: an intermediate layer (20) made of a material with a certain hardness, disposed on a backing layer (10); a sliding layer (30) made of a less hard material, said intermediate layer (20) presenting a radially internal face defined by at least a pair of surfaces, which are excentric to the bearing and which intercept each other along a respective intersection line (22) of the bearing that is inclined relative the opposite end edges, in order to reduce the thickness of said intermediate layer (20), the radially internal face of the sliding layer (30) presenting a curvature radius at maximum equal to the distance between the axis of the bearing and each point of each intersection line (22).

7 Claims, 3 Drawing Sheets

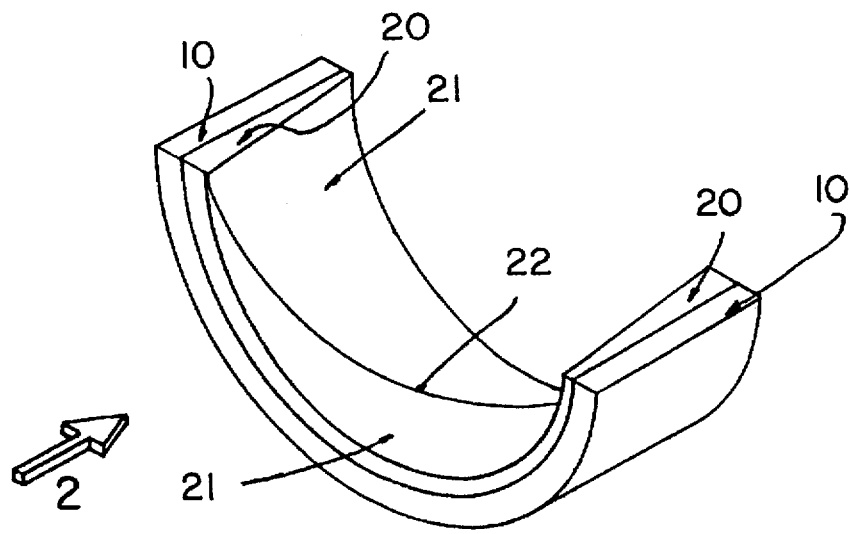
FIG. 1
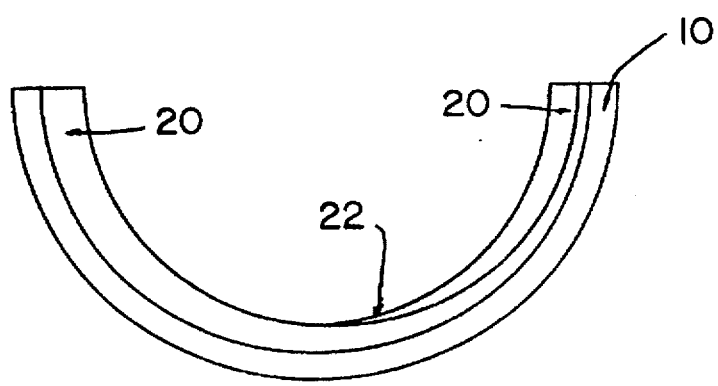
FIG. 2
FIG. 3
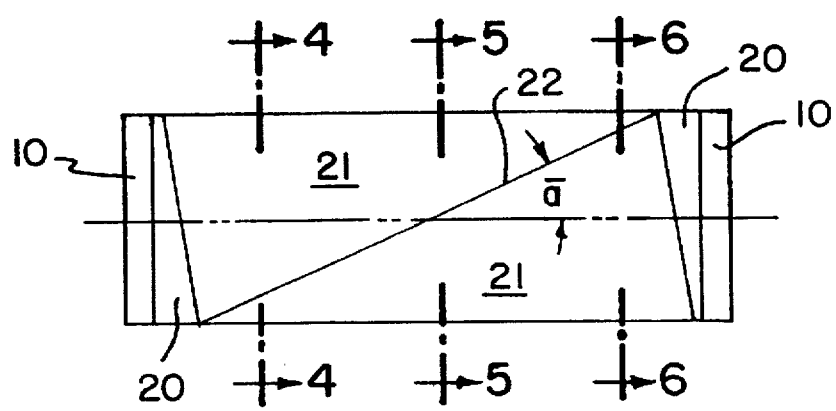

MULTILAYER SLIDING BEARING

FIELD OF THE INVENTION

The present invention relates to a multilayer sliding bearing, which is mainly used in internal combustion engines. More specifically, the present invention relates to a bearing having properties of load capacity and wear resistance.

BACKGROUND OF THE INVENTION

The conventional multilayer sliding bearings are made up of a backing layer, usually of steel, an intermediate layer, which is attached onto the backing layer and which is generally made of copper-based alloy, and a sliding layer, which is disposed on the intermediate layer and which is generally obtained from a copper-tin-lead alloy. In some constructions, between the intermediate layer and the sliding layer, there is disposed a barrier, usually of copper or nickel, in order to avoid the diffusion of tin from the sliding layer to the intermediate layer. Between the intermediate layer and the sliding layer there can also exist a bonding layer.

In this prior art bearings, the shaft is supported only on the sliding layer, which is thus subjected to a substantial wear, thereby reducing its embeddability of foreign particles that may penetrate into the bearing during the operation thereof and reducing the useful life of said bearing. Thus, these known bearings present during a first initial phase of their service life good embeddability properties, but a limited load capacity, due to the fact that the efforts to which the shaft is submitted are transmitted integrally and exclusively to the sliding layer made of a softer material. In a second phase of their service life, these prior art bearings present their sliding layers extremely worn out, as no elements were provided to resist to such wear, besides presenting less embeddability caused by the reduction of their thickness. The wear of the sliding layer when the shaft is submitted to high loads, as it occurs in certain high stroke engines, is substantially accelerated, thereby abbreviating the service life of said bearings.

In order to solve these problems, it has been provided solutions where the sliding layers of the bearings present strips of harder material at the radially internal face of the sliding layer of said bearings, said strips being spaced one from the other by grooves filled with softer material, so as to alternate strips or regions of harder material and softer material on said sliding layer, with the aim of improving the properties of resistance to wear and fatigue. In these solutions, the bearing is provided with grooves having a uniform depth and presenting an equal spacing one from the other provided by identical strips of the same harder material at the radially internal face of the sliding layer and that define contact areas with the shaft. This construction of the bearing allows an even distribution of harder material and softer material on said bearing radially internal face that supports the shaft, resulting in uniform properties to the bearing, regardless of particular requirements of every region of said bearing.

A solution for this problem is described in the U.S. Pat. No. 5,000,586 of the same applicant, where the regions alternating harder material and softer material are presented aligned according to a predetermined angle relative the bearing edges, the softer material regions being disposed according to a variable spacing and/or depth, in order to provide a certain preferred distribution of alternated regions with materials of different hardness on the bearing, thus making the latter a bearing presenting variable properties according to a particular load requirement to which said bearing will be submitted.

Nevertheless, it has been observed that, even in this solution that solves the above mentioned problems, the shaft is still subjected to a substantial wear due to friction, caused by the long time of frictional contact between each point of a circumferential alignment of the lateral surface of the shaft portion that is supported on the bearing during each rotation of said shaft, with some regions of the bearing presenting a certain circumferential extension of harder material at the radially internal face of the sliding layer of said bearing. This wear is a function of the amount of strips or regions of harder material with a certain extension provided at the internal face of the sliding layer, as well as of the width of said regions crosswise the axis of the bearing, said width also depending on the inclination angle of said strips relatively said axis of the bearing.

DISCLOSURE OF THE INVENTION

Thus, it is the object of the present invention to provide a multilayer sliding bearing, which has higher load capacity and wear resistance during all the phases of its service life, thereby keeping an adequate embeddability, while reducing the shaft wear.

Conventionally, the bearing of the present invention has opposite end edges and comprises: a backing layer; an intermediate layer made of a material having a certain hardness; a sliding layer made of a material that is less harder than that of the intermediate layer, said sliding layer being provided on at least a substantial portion of said intermediate layer and presenting a shaft supporting radially internal face, said intermediate layer presenting a radially internal face defined by at least a pair of surfaces excentric to the bearing, the surfaces of each pair of surfaces intercepting each other along a respective intersection line that occupies at least part of the circumferential extension of the bearing and that is inclined relative the opposite end edges of said bearing, said surfaces being inclined from the respective intersection line, in order to reduce the thickness of the intermediate layer from said intersection line, the radially internal face of the sliding layer presenting a curvature radius, which is at maximum equal to the distance between the axis of the bearing and each point of each intersection line.

Onto the intermediate layer, there is applied a sliding layer of soft material as, for example, a copper-tin-lead alloy, which is constructed in such a way as to produce cylindrical surface of contact with the shaft. Depending on the thickness imparted to the sliding layer, the bearing initiates its operation with the shaft being supported exclusively on the sliding layer or, simultaneously, on the sliding layer and on a minimum portion of the intermediate layer, more specifically in contact with at least an intersection line between excentric surfaces, when the curvature radius of the radially internal face of the sliding layer is equal to the distance from said intersection line to the axis of the bearing.

In a first condition, the shaft, when supported exclusively on the sliding layer, gradually removes the soft material therefrom, thereby exposing the intersection lines of the intermediate layer of harder material and thus improving the supporting capacity of the bearing.

Alternatively, the bearing of the present invention can be constructed with the intersection lines being already exposed on the sliding layer, by providing a lesser thickness for the latter, thereby obtaining a bearing with a high load capacity since the beginning of the engine operation.

Also according to the invention, it is possible the construction of a circular bearing assembly, by mounting one of the halves of said bearing with the intermediate layer formed by several excentric surfaces and with the other half of said bearing, which is submitted to lesser efforts by the shaft, being constructed in a conventional form or other preferred form.

This construction is more economical, since it uses one half of the bearing that is more elaborated, and the other half, which is subjected to lesser efforts, and which is manufactured by a conventional process, thereby being useful in crankshaft bearings, for example.

Another embodiment of the present invention foresees the inclusion of oil exits or bags in regions close to a circular partition line between the bearing halves, through the provision of recesses at the sliding layer, said recesses accumulating oil and thus improving the lubricating condition of said bearing.

Solutions showing this purpose are described, for example, in the U.S. Pat. No. 5,181,785.

If the solution presents an intersection line of harder material disposed inclinedly or helically relative the end edges of the bearing, the shaft will have each point of its peripheral lateral surface of each circumferential alignment of the region thereof internal to the bearing supported on isolated punctual regions of harder material of the intermediate layer, along part or the whole bearing axial extension. Such actuation of the isolated punctual regions of the intermediate layer against the surface of the rotating shaft avoids the substantial wear of said shaft, while maximizes the embedding area of the sliding layer, even when under severe engine operative loads.

In this construction, the thickness of the sliding layer is variable, preferably progressively increasing from the regions adjacent the intersection line towards the peripheral end edges of the bearing, thereby guaranteeing excelent properties of embeddability to the bearing.

BRIEF DESCRIPTION OF THE DRAWINGS

The invention will be described below, with reference to the attached drawings, in which:

FIG. 1 is a perspective view of a bearing, which is constructed according to one embodiment of the present invention, without the sliding layer;

FIG. 2 is an axial view of the bearing of FIG. 1;

FIG. 3 illustrates a plan upper view of the bearing shown in the previous figures;

BEST MODE OF CARRYING OUT THE INVENTION

Figure 4:
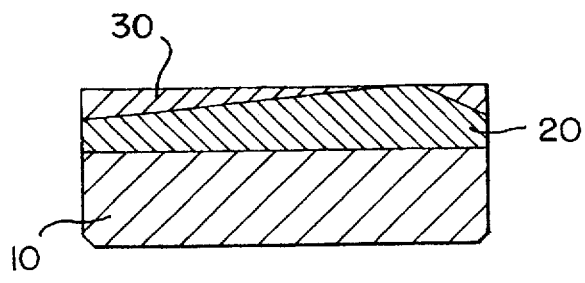
FIGS. 4, 5 and 6 are section views of the bearing illustrated in the previous figures, but including the sliding layer, said views being taken according to lines IV—IV, V—V and VI—VI of FIG. 3, respectively.
Figure 5:
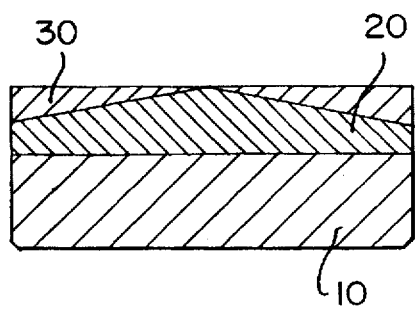
Figure 6:
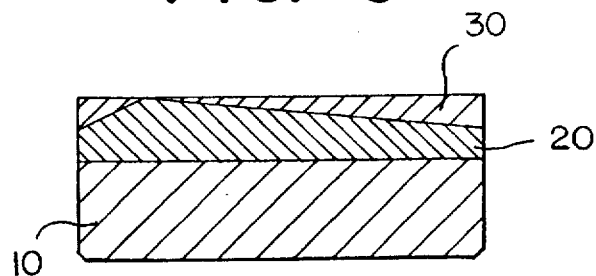
Figure 7:
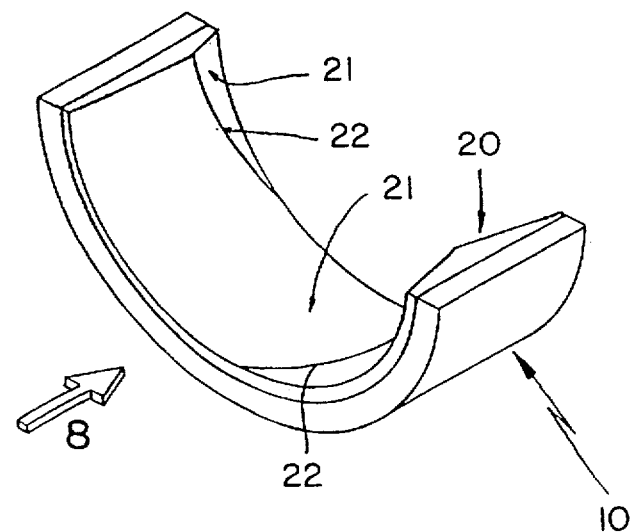
FIG. 7 is a perspective view of a bearing, constructed according to another embodiment of the present invention, but without the sliding layer.
Figure 8:
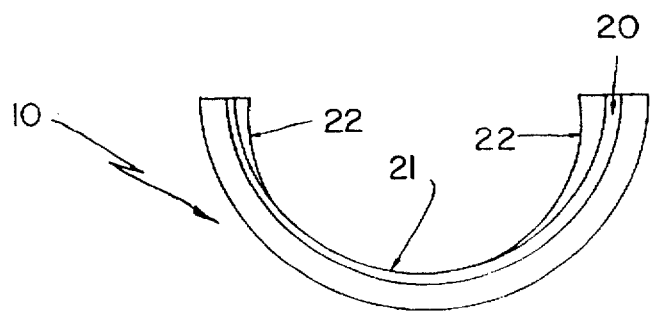
FIG. 8 is an axial view of the bearing of FIG. 7.

According to the illustrations of FIGS. 1 to 6, the bearing comprises a backing layer 10, usually made of steel or another adequate material, onto which is applied an intermediate layer 20, preferably made of aluminum or an aluminum-based alloy, the application of the intermediate layer being made through casting, sintering, electrodeposition or any other known process.

In this constructive form of the present invention, after being applied onto the backing layer 10, the intermediate layer 20 is submitted to machining operations, in order that its internal face be defined by preferably two surfaces 21 with portions that are substantially excentric relative that portion defined by the intersection of the internal region of the intermediate layer 20 with the backing layer 10 and that are inclined towards the peripheral end edges of the bearing, said surfaces 21 having, as intersection, a line 22 which extends along the circumferential length of the radially internal face of the intermediate layer 20, according to a direction inclined in relation to the planes of the peripheral end edges of the bearing.

The intersection line 22 is usually designed so that its ends are each situated at one of the peripheral end edges of the intermediate layer 20, close to a respective diametral end edge of the bearing. In this disposition, an angle a, which is formed by the intersection line 22 with the planes of the peripheral end edges of the bearing, presents a value superior to 0° and inferior to 90°. Onto the intermediate layer there is then applied a sliding layer 30, whose thickness is progressively increased from the intersection line 22 towards the peripheral end edges of the bearing.

The intersection line 22 defines substantially punctual regions, which are aligned according to a predetermined angular inclination of said intersection line at the radially internal face of the sliding layer 30. Although not illustrated, said punctual regions can further define discontinuous intersection lines of harder material adjacent or at the radially internal face of the sliding layer 30, according to one or more alignments of punctual regions, which are predetermined in function of the characteristics required from the bearing for a specific application. According to the type of the application, said punctual regions can define a unique intersection line, extending helically throughout the whole circumferential length of the radially internal face of the bearing, or they can further define intersection lines of non-homogeneous distribution along the axial length of the bearing, in function of the characteristics of load requirements of said bearing.

In a constructive variant of the present invention, when the sliding layer 30 covers the whole intermediate layer of the bearing, the operation of a shaft, which is not illustrated, occurs with said shaft being supported integrally on said sliding layer 30. The rotation of said shaft progressively removes portions of said sliding layer 30, thus exposing the intersection line (or lines) 22 of harder material of the intermediate layer to a contact with the shaft, thereby increasing the supporting capacity of the bearing, which is going to be discussed below.

In this construction, the curvature radius of the radially internal face of the sliding layer 30 is inferior to the distance between the axis of the bearing and each point of the intersection line (or lines).

In the illustrated constructive forms of the present invention, the radially internal face of the sliding layer 30 exhibits the intersection lines. In this case, the curvature radius of the radially internal face of the sliding layer 30 is equal the distance between the axis of the bearing and each point of said intersection lines that is exposed at said radially internal face of the sliding layer 30.

Figure 9:
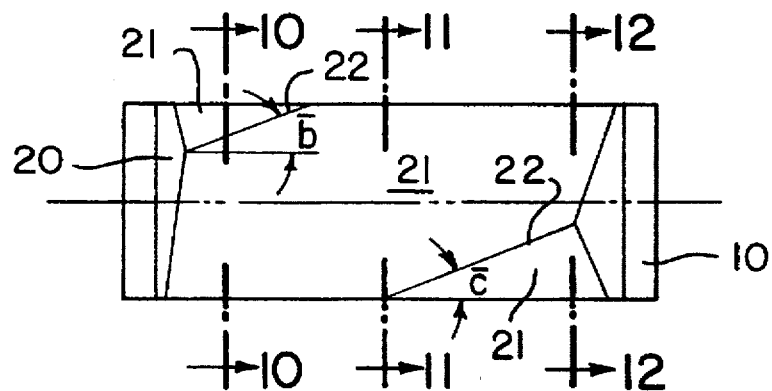
FIG. 9 illustrates a plan upper view of the bearing shown in FIGS. 7 and 8.
Figure 10:
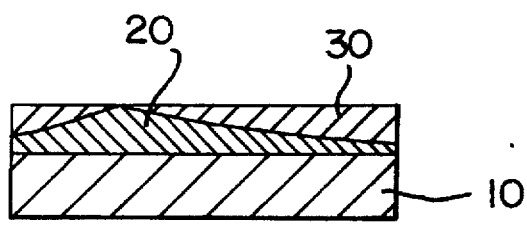
FIGS. 10, 11 and 12 are section views of the bearing illustrated in FIGS. 7, 8 and 9, including the sliding layer, said views being taken according to the lines X—X, XI—XI and XII—XII of FIG. 9, respectively.
Figure 11:
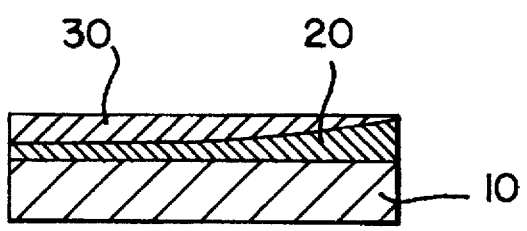
Figure 12:
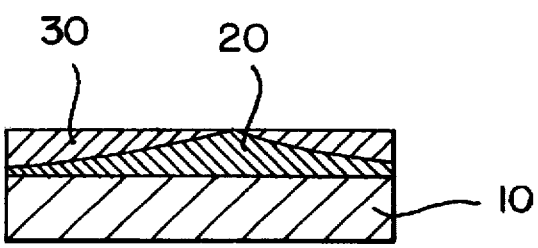

FIGS. 7 to 12 illustrate another constructive form to execute the present invention, in which the intermediate layer 20 is submitted to machining operations forming surfaces 21, with portions that are excentric relative that portion defined by the intersection of the internal region of the intermediate layer 30 with the backing layer 10, said portions being inclined towards the peripheral end edges of the bearing, each pair of said surfaces 21 having as intersection the respective interception line 22, which extends along at least part of the circumferential length of the radially internal face of the intermediate layer 20, according to a corresponding direction, that is inclined in relation to the planes of the peripheral end edges of the bearing, according to the angles b and c, respectively, as illustrated in FIG. 9, said angles presenting a value superior to 0° and inferior to 90°. Onto the intermediate layer, it is then applied a sliding layer 30, whose thickness is progressively increased from the intersection line 22 up to the peripheral end edges of the bearing.

In each of the illustrated constructive forms, the intersection lines are defined at the radially internal face of the sliding layer 30, so that each point of the external lateral surface of a circumferential alignment of the shaft portion internal to the bearing is supported, at each revolution, on a point of each intersection line. These constructions allow a substantial increase in the load capacity, since the beginning of the shaft operation, without submitting said shaft to excessive friction wear, resulting from the long time of exposure of each point of said shaft to portions of harder material of the intermediate layer.

In any one of the above cited constructions, the bearing has its resistance obtained through the harder material punctual regions being anchored to the backing layer 10. These punctual regions submit each point of a circumferential alignment of the shaft lateral surface, during each rotation of said shaft, to a shorter time of frictional contact with the harder material at the sliding layer, thereby reducing the friction wear of said shaft.

We claim:

1. Multilayer sliding curved bearing having end edges and which comprises:
   a backing layer;
   an intermediate layer on said backing layer of a material with a predetermined hardness;
   a sliding layer of a material less hard than that of the intermediate layer on at least a substantial portion of said intermediate layer forming a shaft supporting radially internal face,
   wherein said intermediate layer has a radially internal face defined by at least one pair of surfaces eccentric to the bearing, a said pair of surfaces intercepting each other along a respective intersection line that occupies at least part of the circumferential extension of the bearing and that is inclined relative the opposite end edges of said bearing, said surfaces of said intermediate layer being inclined from the respective intersection line to reduce the thickness of said intermediate layer from said intersection line, the radially internal face of the sliding layer forming a curvature radius which is at maximum equal to the distance between the axis of the bearing and each point of a said intersection line.

2. Multilayer sliding bearing, according to claim 1, wherein a said intersection line is defined along the respective portion of the bearing circumferential extension to correspond to the distribution of load to be supported by said bearing.

3. Multilayer sliding bearing, according to claim 1, wherein a said intersection line is defined by a respective alignment of substantially punctual regions of a harder material of the intermediate layer at the bearing support radially internal face, when the radius of the internal face of the sliding layer is equal to the distance between the axis of the bearing and each point of each intersection line.

4. Multilayer sliding bearing, according to claim 3, wherein a said intersection line is defined by a continuous alignment of substantially punctual regions.

5. Multilayer sliding bearing according to claim 1 where said intermediate layer has only a single pair of surfaces and there is only one said intersection line.

6. Multilayer sliding bearing according to claim 1 wherein said intermediate layer has three surfaces forming two pair of such surfaces, each pair having a respective intersection line.

7. Multilayer sliding bearing according to claim 1 wherein said intermediate layer has n surfaces, with n being at least 3, that form n−1 pairs of said surfaces, each pair having a respective intersection line.

* * * * *

UNITED STATES PATENT AND TRADEMARK OFFICE
CERTIFICATE OF CORRECTION

PATENT NO. : 5,707,155
DATED : January 13, 1998
INVENTOR(S) : Robert Richard Banfield, José Roberto Simão, and Ademir Carubelli It is certified that error appears in the above-identified patent and that said Letters Patent is hereby corrected as shown below:

On the title page, item [86], as follows:

Delete "§ 371 Date: Jun. 28, 1996" and insert therefor --§ 371 Date: Jun. 28, 199_5_--

Delete "§ 102(e) Date: Jun. 28, 1996" and insert therefor --§ 102(e) Date: Jun. 28, 199_5_--

Signed and Sealed this

Nineteenth Day of January, 1999

Attest:

Attesting Officer

*Acting Commissioner of Patents and Trademarks*